Oct. 10, 1944.  W. B. JOHNSON  2,359,764
FOLDING BICYCLE PEDAL
Filed April 21, 1943  2 Sheets-Sheet 1

INVENTOR
WILLIAM B. JOHNSON
BY
*C. E. Herrstrom & H. C. Thibodeau*
ATTORNEYS Oct. 10, 1944.   W. B. JOHNSON   2,359,764
FOLDING BICYCLE PEDAL
Filed April 21, 1943   2 Sheets-Sheet 2
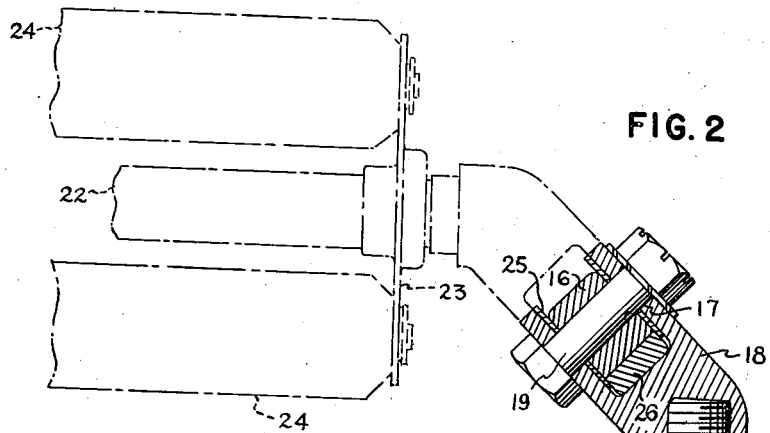
FIG. 2
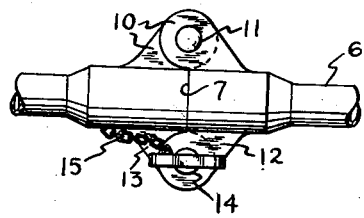
FIG. 3
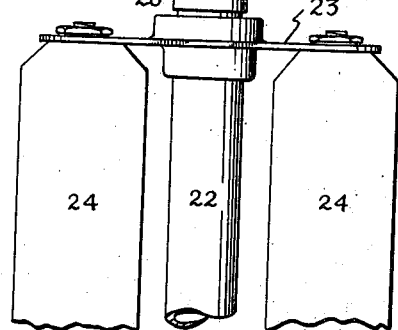
FIG. 5
FIG. 4
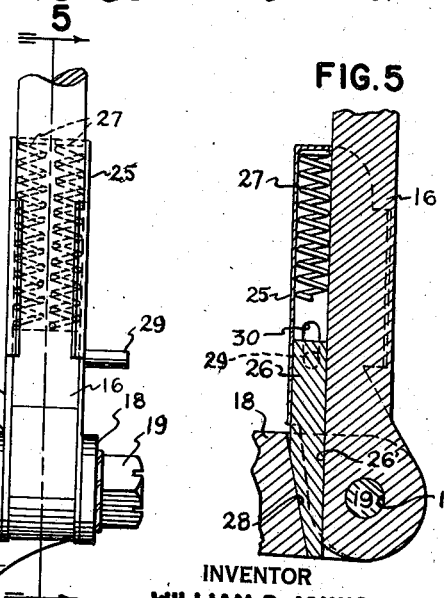
INVENTOR
WILLIAM B. JOHNSON
BY
*C. E. Herrström & H. C. Thibodeau*
ATTORNEYS Patented Oct. 10, 1944

2,359,764

UNITED STATES PATENT OFFICE 2,359,764

FOLDING BICYCLE PEDAL

William B. Johnson, Aberdeen Proving Ground, Md.

Application April 21, 1943, Serial No. 483,836

4 Claims. (Cl. 74—594.7)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel folding bicycle and more particularly to a pedal for such a bicycle.

The frame of a folding bicycle has hinge joints in a substantially central vertical axis so that in the folded position the wheels are in juxtaposition in parallel planes. Bicycles of this character are already known in the art. They are useful in military patrol work, camping expeditions and for similar purposes.

In such a bicycle it is desirable to swing the pedals so that their axes lie parallel to the plane of the frame when the frame is folded. Otherwise, they occupy an awkward position with respect to the folded bicycle especially when the latter is to be carried on the back of a soldier. Such adjustability of the pedal is a desirable feature also in a non-folding bicycle for purposes of transportation.

The adjustable pedals previously proposed are not satisfactory for military purposes for various reasons. The object of the present invention is to provide a pedal that can be quickly shifted from one position to another and held securely in the operative position, in a simple and durable construction.

The invention is full disclosed by way of example in the following description and in the accompanying drawings in which:

Figure 2 is a section on the line 2—2 of Figure 1;

Figure 3 is an elevation on the line 3—3 of Figure 1;

Figure 4 is a detail vertical elevation viewing the pedal from approximately 45°;

Figure 5 is a section on the line 5—5 of Figure 4, and

Figure 6 is an edge view of the carrying plate.

Reference to these views will now be made by use of like characters which are employed to designate corresponding parts throughout.

Figure 1:
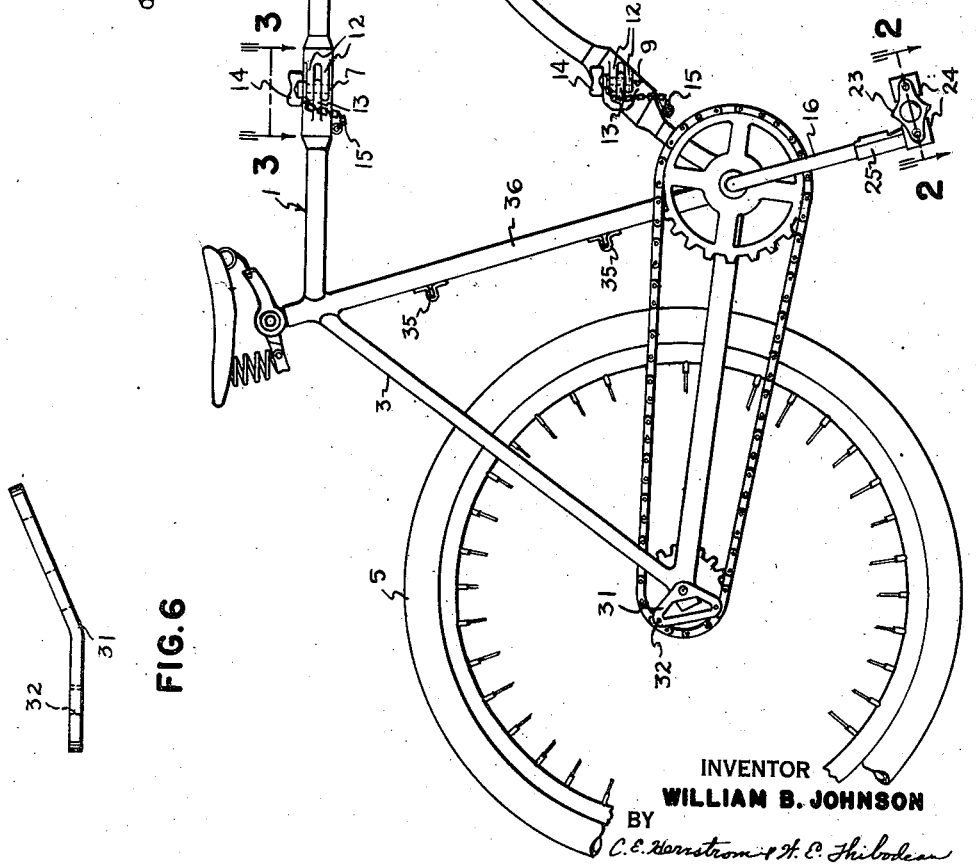
Figure 1 is an elevation of the bicycle in the operative position.

In Figure 1 is shown a bicycle comprising a triangular frame 1, a front fork 2, a rear fork 3, and front and rear wheels 4 and 5 carried by the forks. The horizontal frame tube 6 is split at 7 substantially at its midpoint, and the sloping frame tube 8 is similarly split at 9 in vertical alignment with the split 7.

The joint at each of the splits 7 and 9 includes ears 10 on both ends at the one side of the frame, overlapped and pivoted together by pins 11. At the other side of the frame, one of the ends carries a pair of ears 12 between which is received a similar ear 13 extending from the other end. The apertures of these ears are adapted to register and to receive a pin 14 which threads into the lowermost ear, whereby the frame is made rigid in the operative position. The pins 14 may hang from convenient parts of the frame by means of chains 15.

The bottom of the frame carries vertical crank arms 16 at both sides, rotatably mounted in the usual manner. The free end of each arm is formed with a hole 17, the axis of which lies in a horizontal plan and at approximately 45° to the plane of the frame. A clevis 18 is mounted on the crank arm at the hole by means of a bolt 19. The clevis is formed with a tapped hole 20 into which is screwed one end of a pedal axle 21. The axle carries a pedal of usual construction consisting of a central tube 22, end plates 23, and pedal pads 24 held by and between the plate at opposite sides of the axle tube. The axis of the opening 20 lies at 45° to that of the hole 17, thereby bringing the pedal axis in operative position normal to the plane of the frame or the hole may be otherwise disposed and the axle bent to locate the pedal properly. Being rotatable on the bolt 19, the clevis and pedal may be swung counter-clockwise from the normal position through an arc of 90°, as a result of which the pedal lies substantially in the plane of the frame and no longer projects laterally from that plane. In other words, the objection of a protruding pedal on a transported bicycle has been removed.

The means for securing the pedal rigidly in the operative position includes a suitably shaped retainer 25 mounted on the lower end of the arms 16 and secured at its lower end to the arm by the bolt 19 as shown in Figure 4. The retainer contains a wedge 26 slidable along a flatted face 26' on the lower end of the arm. Coil springs 27 mounted upon the wedge tend to force the latter into a correspondingly shaped slot 28 formed in the clevis 18 adjacent to its swivelled end. The wedge can be lifted manually by means of a pin 29 extending therefrom through a slot 30 in the retainer 25. While the wedge 26 is engaged in the slot 28, the pedal cannot be forced to turn on the bolt 19. The wedge is raised by manual pressure on the pin 29 to release the pedal for rotation to its idle position.

To the rear axle of the bicycle is attached a plate 31 having suitably located apertures 32. The soldier may attach his haversack to the plate when he is about to carry the bicycle.

A strap 33 is laced between eyelets 34 at the forward end of the frame members 6 and 8. This strap may serve various purposes, such as a carrier strap, or may be passed through eyelets 35 on the saddle pillar 36 to hold the bicycle in the folded position.

For the purpose of this description and the claims, it will be assumed that the frame of the bicycle is in a vertical plane.

Although specific embodiments of the invention have been illustrated and described, it will be understood that various alterations in the details on construction may be made without departing from the scope of the invention as indicated by the appended claims.

What I claim is:

1. In a folding pedal for a bicycle, a pedal axle, a member mounted on the inner end of said axle and forming approximately a 45° angle to the axis of said axle, a crank arm pivotally mounted on said member whose pivotal axis is also at approximately a 45° angle to said axle axis, whereby said pedal when folded is positioned inside the crank arm, and means for locking said arm and crank arm together when the pedal is in operative position.

2. In a folding pedal for a bicycle, a pedal axle, a clevis mounted on the inner end of said axle and forming approximately a 45° angle to the axis of said axle, a crank arm pivotally mounted in said clevis whose pivotal axis is also at approximately a 45° angle to said axle axis, a spring backed wedge carried by said arm and adapted to be projected between the clevis and said arm to lock the arm and clevis together when the pedal is in operative position.

3. In a folding pedal for a bicycle, a pedal axle, a bifurcated member pivotally mounted on said axle and forming an angle of approximately 45° to the axis of said axle, a crank arm pivotally mounted between the arms of said bifurcated member and whose pivotal axis is also at approximately 45° to said axle axis, said bifurcated member having a downwardly inclined wall between its arms from which wall the crank arm is spaced, a spring backed wedge member carried by said arm and having a surface corresponding to the inclination of said wall whereby wear between the wedge and the wall is automatically compensated for.

4. The invention of claim 3, characterized in that there is means carried by the wedge member to facilitate the withdrawal of said wedge member against the force of its spring.

WILLIAM B. JOHNSON.